US012549695B2

(12) United States Patent
Mashitani et al.

(10) Patent No.: US 12,549,695 B2
(45) Date of Patent: Feb. 10, 2026

(54) PROJECTION CONTROL METHOD AND PROJECTION CONTROL DEVICE

(71) Applicant: Panasonic Intellectual Property Management Co., Ltd., Osaka (JP)

(72) Inventors: Ken Mashitani, Osaka (JP); Chiharu Tsubota, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 167 days.

(21) Appl. No.: 18/219,807

(22) Filed: Jul. 10, 2023

(65) Prior Publication Data

US 2023/0353714 A1    Nov. 2, 2023

Related U.S. Application Data

(63) Continuation of application No. PCT/JP2022/003435, filed on Jan. 28, 2022.

(30) Foreign Application Priority Data

Jan. 29, 2021  (JP) ................................ 2021-013886

(51) Int. Cl.
*H04N 9/31* (2006.01)
*G03B 21/20* (2006.01)
*G03B 21/26* (2006.01)

(52) U.S. Cl.
CPC ....... *H04N 9/3179* (2013.01); *G03B 21/2033* (2013.01); *G03B 21/26* (2013.01)

(58) Field of Classification Search
CPC ... H04N 9/3179; G03B 21/2033; G03B 21/26
See application file for complete search history.

(56) References Cited

U.S. PATENT DOCUMENTS

| 2008/0136976 A1* | 6/2008 | Ajito | H04N 9/3185 348/745 |
| 2010/0103330 A1* | 4/2010 | Morrison | H04N 9/3185 353/121 |

(Continued)

FOREIGN PATENT DOCUMENTS

| JP | 2011-118713 A | 6/2011 |
| JP | 2016-144114 A | 8/2016 |

(Continued)

OTHER PUBLICATIONS

International Search Report issued Apr. 12, 2022 in International (PCT) Application No. PCT/JP2022/003435.

(Continued)

*Primary Examiner* — Yassin Alata
(74) *Attorney, Agent, or Firm* — Wenderoth, Lind & Ponack, L.L.P.

(57) ABSTRACT

A projection control method includes causing a projector to project a projection image including projection indexes, causing a camera to capture the projection image, causing a display to display an instruction for a user to position camera indexes within an imaging range, the camera indexes indicating positions relative to the projection indexes in a camera coordinate system obtained by capturing the projection image, detecting camera coordinates which are the coordinates of the camera indexes positioned, and determining, according to relative positional relations between the projection indexes and the camera indexes, the correspondence relations between the camera coordinates and projection coordinates.

17 Claims, 14 Drawing Sheets

(56) References Cited

U.S. PATENT DOCUMENTS

| | | | |
|---|---|---|---|
| 2018/0014008 A1 | 1/2018 | Sugiura | |
| 2018/0359466 A1 | 12/2018 | Sugiura | |
| 2019/0114801 A1 | 4/2019 | Shimaoka et al. | |
| 2019/0116356 A1 | 4/2019 | Matoba et al. | |
| 2019/0306478 A1 | 10/2019 | Tamura | |
| 2019/0327457 A1 | 10/2019 | Urano et al. | |
| 2019/0385272 A1* | 12/2019 | Aoki | G09G 3/001 |
| 2021/0227188 A1* | 7/2021 | Aoki | H04N 9/3185 |
| 2022/0021856 A1 | 1/2022 | Nakamura et al. | |
| 2022/0109814 A1 | 4/2022 | Saito et al. | |

FOREIGN PATENT DOCUMENTS

| | | |
|---|---|---|
| JP | 2018-5115 | 1/2018 |
| JP | 2018-207373 | 12/2018 |
| JP | 2019-74699 | 5/2019 |
| JP | 2019-176356 | 10/2019 |
| JP | 2019-192996 | 10/2019 |
| JP | 2020-27976 A | 2/2020 |
| JP | 2021-9265 | 1/2021 |
| WO | 2017/179272 | 10/2017 |
| WO | 2020/261741 | 12/2020 |

OTHER PUBLICATIONS

Notice of Reasons for Refusal issued Jun. 17, 2025 in corresponding Japanese Application No. 2022-578525, with machine translation, 7 pages.

* cited by examiner

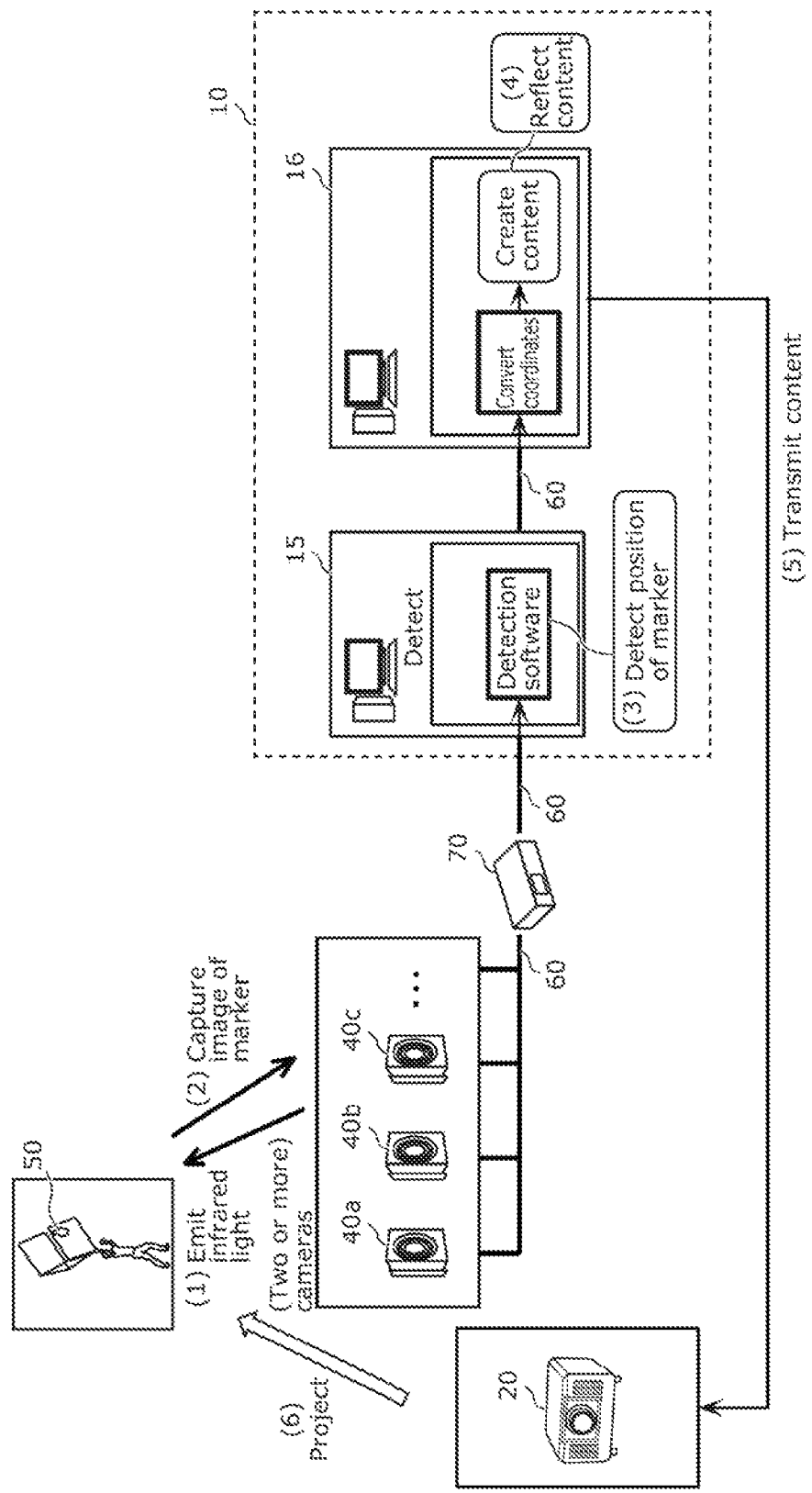

PROJECTION CONTROL METHOD AND PROJECTION CONTROL DEVICE

CROSS REFERENCE TO RELATED APPLICATIONS

This is a continuation application of PCT International Application No. PCT/JP2022/003435 filed on Jan. 28, 2022, designating the United States of America, which is based on and claims priority of Japanese Patent Application No. 2021-013886 filed on Jan. 29, 2021. The entire disclosures of the above-identified applications, including the specifications, drawings and claims are incorporated herein by reference in their entirety.

FIELD

The present disclosure relates to a projection control method and a projection control device.

BACKGROUND

Japanese Unexamined Patent Application Publication No. 2018-207373 discloses a calibration device that calibrates a projector, obtains position information items indicating the characteristic points of a screen, corrects the positions of the characteristic points of a test image according to the difference in the obtained position information items, and re-calibrates the projector.

CITATION LIST

Patent Literature

PTL 1: Japanese Unexamined Patent Application Publication No. 2018-207373

SUMMARY

Technical Problem

In conventional calibration devices, projector and camera positions are not associated in a simple structure.

The present disclosure aims to provide, for example, a projection control method by which it is possible to associate projector and camera positions in a simple structure.

Solution to Problem

To achieve the above objective, a projection control method according to an aspect of the present disclosure is provided. The projection control method is a projection control method performed by a processor to control projection of an image by a projector and includes causing the projector to project a projection image including projection indexes positioned within the projection range of the projector, causing a camera to capture the projection image within an imaging range, causing a display to display an instruction for a user to position camera indexes within the imaging range, the camera indexes indicating positions relative to the projection indexes in a camera coordinate system obtained by capturing the projection image, detecting camera coordinates which are the coordinates of the camera indexes positioned, and determining, according to relative positional relations between the projection indexes and the camera indexes, correspondence relations between the camera coordinates within the imaging range of the camera and projection coordinates within the projection range of the projector.

A projection control device according to another aspect of the present disclosure is a projection control device that controls projection of an image by a projector. The projection control device includes a first projection controller that causes the projector to project a projection image including projection indexes positioned within the projection range of the projector, a detection controller that causes a camera to capture the projection image within an imaging range, a display controller that causes a display to display an instruction for a user to position camera indexes within the imaging range, the camera indexes indicating positions relative to the projection indexes in a camera coordinate system obtained by capturing the projection image, a camera coordinate detector that detects camera coordinates which are the coordinates of the camera indexes positioned, and a controller that determines, according to relative positional relations between the projection indexes and the camera indexes, correspondence relations between the camera coordinates within the imaging range of the camera and projection coordinates within the projection range of the projector.

Advantageous Effects

By using, for example, a projection control method according to one aspect of the present disclosure, it is possible to associate projector and camera positions in a simple structure.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 9 illustrates a configuration of a projection control device according to Embodiment 2.

DESCRIPTION OF EMBODIMENTS

Figure 1:
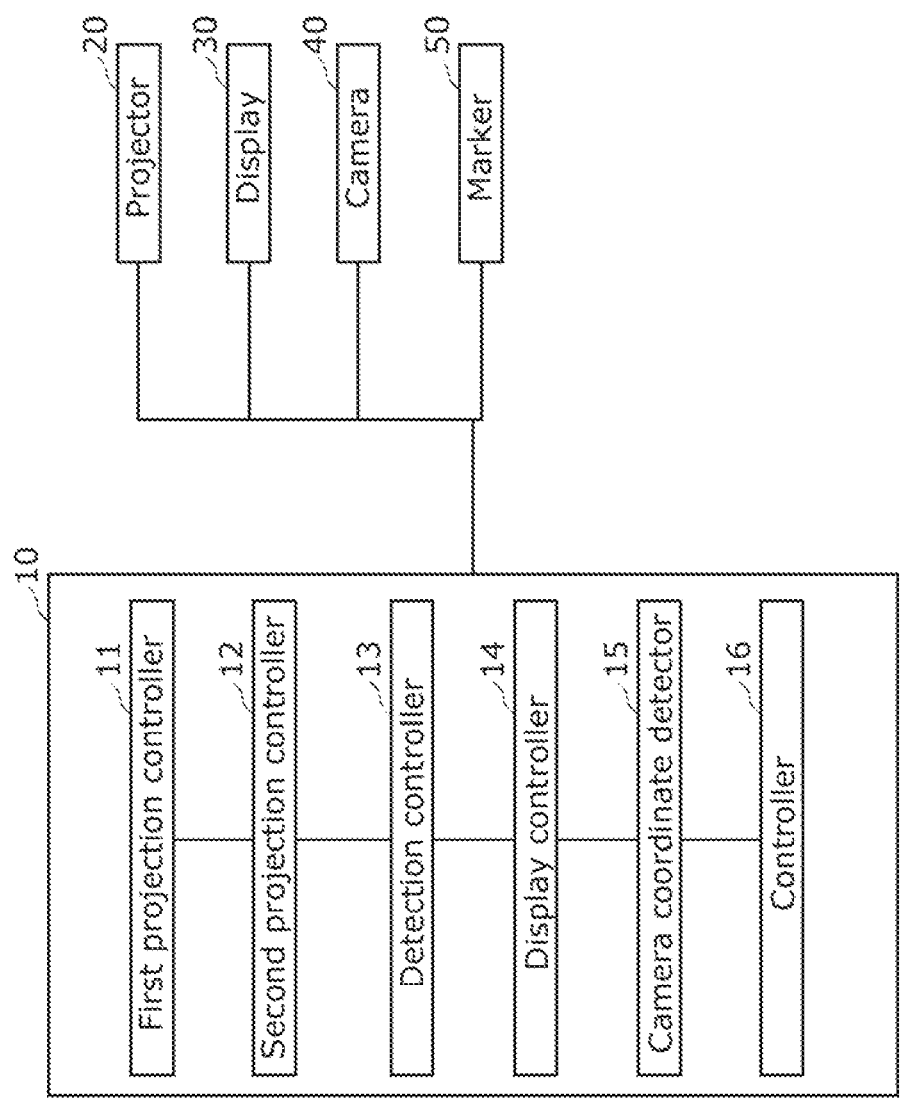
FIG. 1 is a block diagram of a projection control device according to Embodiment 1.

Embodiments of the present disclosure are described below with reference to the drawings. It should be noted that the embodiments described below show specific examples of the present disclosure. Thus, the numerical values, shapes, materials, structural elements, positions and connections of the structural elements, steps, order of the steps, and other descriptions provided below in the embodiments are mere examples and are not intended to limit the present disclosure.

The drawings are schematic views and are not necessarily precisely drawn. Thus, for instance, scales in the drawings are not necessarily the same. In the drawings, substantially the same structural elements are assigned the same reference symbol. Overlapping explanations are omitted or simplified.

Projection control methods and projection control devices according to the embodiments below are described.

Embodiment 1

[Configuration of Projection Control Device]

A configuration of a projection control device is described. FIG. 1 is a block diagram of projection control device 10 according to Embodiment 1. Projection control device 10 includes first projection controller 11, second projection controller 12, detection controller 13, display controller 14, camera coordinate detector 15, and controller 16. Projection control device 10 is connected by wire or wirelessly to projector 20, display 30, and camera 40. Projection control device 10 causes camera 40 to capture an image of marker 50 and uses the image for calibration performed at the time of video projection.

Projection control device 10 includes a processor and memory. The processor is, for example, a central processing unit (CPU). Memory is, for example, dynamic random-access memory (DRAM) or static random-access memory (SRAM). Alternatively, the memory may be nonvolatile memory such as read-only memory (ROM) or flash memory.

First projection controller 11 causes projector 20 to project a projection image including projection indexes positioned within the projection range of projector 20. First projection controller 11 generates the projection image including the projection indexes and causes projector 20 to project the projection image. First projection controller 11 obtains the coordinates of the projection indexes at the time of projection. That is, first projection controller 11 obtains the coordinates of the positions of the projection indexes in a coordinate system obtained when the projection image is generated. It should be noted that the coordinates of the projection indexes at the time of the projection are coordinates in a coordinate system set by projection control device 10 when the projection indexes are projected and are differentiated from the coordinates of the positions of the projection indexes in a coordinate system on a projection plane (a coordinate system in a camera image, which is described later).

Detection controller 13 causes camera 40 to capture the projection image within an imaging range. Detection controller 13 may generate a camera image from the image captured by camera 40. That is, the camera image includes the projection indexes projected as the content of the projected image.

Display controller 14 causes the display to display an instruction for a user to position camera indexes within the imaging range, the camera indexes indicating positions relative to the projection indexes in a camera coordinate system obtained by capturing the projection image. Specifically, for instance, display controller 14 may cause display 30 to display the camera image on which the camera indexes are superimposed, the camera indexes indicating positional relations relative to the projection indexes within the camera image. In Embodiment 1, the number of the camera indexes is the same as that of the projection indexes. Here, the projection positions of the camera indexes displayed may be the positions at which the corresponding projection indexes should be within the camera image.

Camera coordinate detector 15 detects the coordinates of the positioned camera indexes. That is, camera coordinate detector 15 detects the coordinates of the camera indexes positioned by the user onto a screen or in a space where projector 20 and projection control device 10 are present. Specifically, for instance, camera coordinate detector 15 may receive an operation to move, on display 30, one of the group of the projection indexes or the group of the camera indexes, the operation being performed by the user to adjust the positional relations between the projection indexes and the camera indexes, the projection indexes and the camera indexes being included in the camera image displayed on display 30.

According to the relative positional relations between the projection indexes and the camera indexes, controller 16 determines the correspondence relations between the camera coordinates within the imaging range of the camera and the projection coordinates within the projection range of the projector. Specifically, according to the movement on display 30 of one of the group of the projection indexes or the group of the camera indexes, controller 16 may determine the correspondence relations between the camera coordinates within the imaging range of camera 40 and the projection coordinates within the projection range of projector 20, the projection indexes and the camera indexes being included in the camera image. For instance, according to the amount of movement of one of the group of the projection indexes or the group of the camera indexes relative to the other group, controller 16 may determine correspondence relations between the camera coordinates and the coordinates of the projection indexes at the time of the projection.

In addition, controller 16 may cause camera 40 to capture an image of marker 50 present in the projection range. Controller 16 may obtain the camera coordinates of marker 50 in the camera coordinate system in the image of marker 50 captured by camera 40. Controller 16 may convert the camera coordinates of marker 50 into projection coordinates, by using the determined correspondence relations. Controller 16 may cause projector 20 to project an image at the position of marker 50, by using the projection coordinates of marker 50 obtained through the conversion, the position being the position of marker 50 when the image of marker 50 is captured by camera 40.

Second projection controller 12 causes projector 20 to project an image, by using the projection coordinates based on the determined correspondence relations.

Under the control of projection control device 10, projector 20 projects the projection image including the projection indexes onto a projection plane. The projector may be a cathode-ray tube (CRT) projector that enlarges an image displayed on a CRT by using an optical system, such as a lens, and projects the enlarged image. The projector may be a liquid crystal projector that enlarges, by using a lens, an image obtained by transmitting light from a light source lamp using discharge light through internal liquid crystal panels and projects the enlarged image onto a screen. In addition, the projector may be a digital light processing (DLP) projector, a liquid crystal on silicon (LCOS) projector, a granting light valve (GLV) projector, or a laser projector.

Under the control of projection control device 10, display 30 displays the camera image and the camera indexes. Display 30 may be a CRT display, a liquid crystal display, an organic electro-luminescence (EL) display, or a plasma display.

Under the control of projection control device 10, camera 40 captures an image of an imaging area including the projected projection image. Camera 40 is, for example, a visible light camera or an infrared camera. More than one camera 40 may be provided, and cameras 40 may include a visible light camera and an infrared camera. As camera 40, an ultraviolet camera may be used instead of an infrared camera. Cameras 40 just need to include a camera capable of imaging invisible light.

Marker 50 is an object which serves as a mark and an image of which is captured by, for example, an infrared camera. Marker 50 includes an infrared reflective material and reflects infrared light emitted from infrared light 81. Since marker 50 reflects infrared light, an infrared image captured by the infrared camera shows marker 50. Marker 50 is not connected by wire or wirelessly to projection control device 10.

The infrared reflective material may be a retroreflective material. In projection control device 10, infrared light 81 is near the infrared camera. The retroreflective material of marker 50 reflects infrared light emitted from infrared light 81, toward the infrared camera.

Marker 50 may include a light emitting diode (LED) instead of the infrared reflective material. Marker 50 itself may emit infrared light or visible light.

[High-Speed Projection Mapping System]

Figure 2:
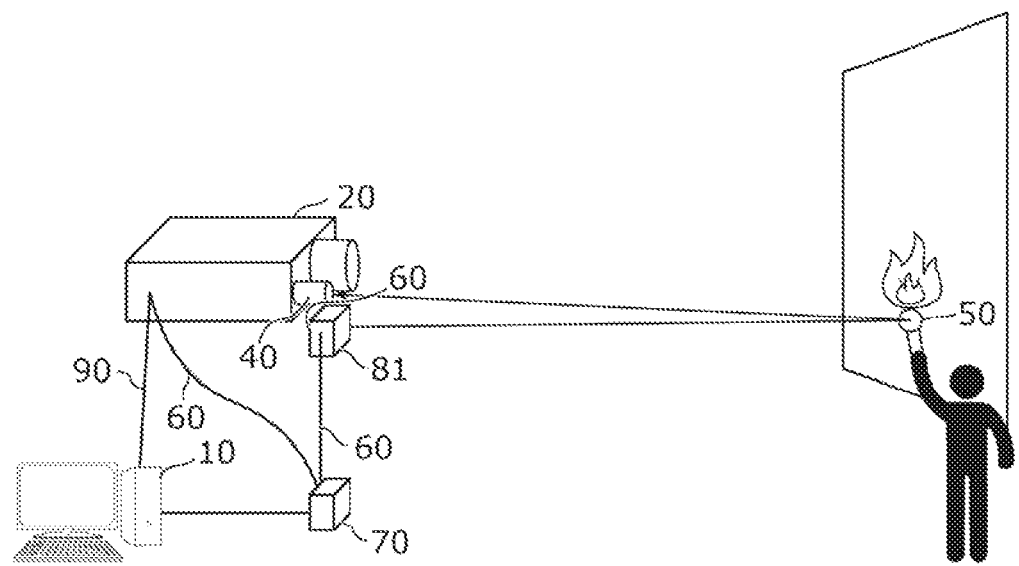
FIG. 2 is a schematic view of a high-speed projection mapping system.

A high-speed projection mapping system using projection control device 10 according to Embodiment 1 is described below. FIG. 2 illustrates an overview of the high-speed projection mapping system. In the high-speed projection mapping system, a high-speed projector tracks the motion of marker 50 detected by the infrared camera and projects an image.

In the high-speed projection mapping system, the high-speed projector projects, onto a screen, an image transmitted from a content server including, for example, a PC. For instance, a person holding marker 50 stands in front of the screen. Then, the high-speed projection mapping system causes infrared light 81 to emit infrared light and marker 50 to reflect the infrared light.

The high-speed projection mapping system causes the infrared camera to capture an image of marker 50 reflecting the infrared light. The high-speed projection mapping system causes the high-speed projector to project an image at the position of marker 50 on the screen. By repeating the series of processing steps, the high-speed projection mapping system can project the image onto the screen so that the image tracks the motion of marker 50.

For instance, the frame rate of the high-speed projector may be 240 frames per second (fps). The frame rate of the infrared camera may be 240 fps. The frequency of the content server may be 240 Hz.

It should be noted that the marker may be behind the screen when viewed from the high-speed projector. The infrared camera may capture infrared light reflected by the marker, through the translucent or transparent screen and capture an image of the marker.

Figure 3:
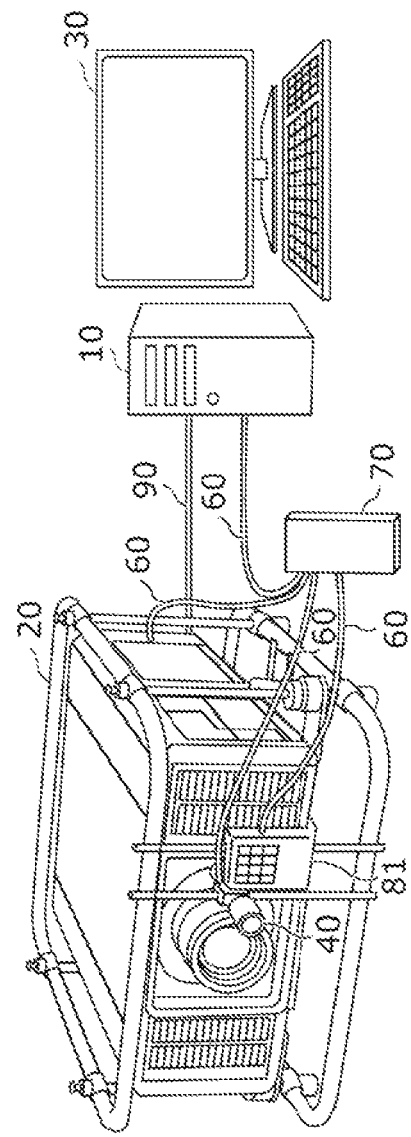
FIG. 3 illustrates pieces of equipment of the high-speed projection mapping system.

FIG. 3 illustrates pieces of equipment of the high-speed projection mapping system. The high-speed projection mapping system includes high-speed projector 20, a content server equipped with, for example, a CPU, display 30, and PoE power supply compatible hub 70. High-speed projector 20 may include pieces of sensing equipment. The pieces of sensing equipment include, for example, an industrial camera, a camera lens, a visible light cut filter, an infrared light projector, and a retroreflective sheet. The high-speed projector is connected to the content server via high-definition multimedia interface (HDMI) (registered trademark) 90, which serves as a video signal line. The content server is connected to PoE power supply compatible hub 70 via LAN cable 60. Here, PoE stands for Power over Ethernet. PoE power supply compatible hub 70 is connected to the parts of high-speed projector 20 via LAN cables 60. PoE power supply compatible hub 70 may supply power to the industrial camera or the infrared light projector. An image stored in the content server may be transmitted to the high-speed projector via the HDMI (registered trademark). Then, the high-speed projector may project the image. At the same time, the display may display the image.

[Issue in Projection Control in High-Speed Projection Mapping]

Figure 4:
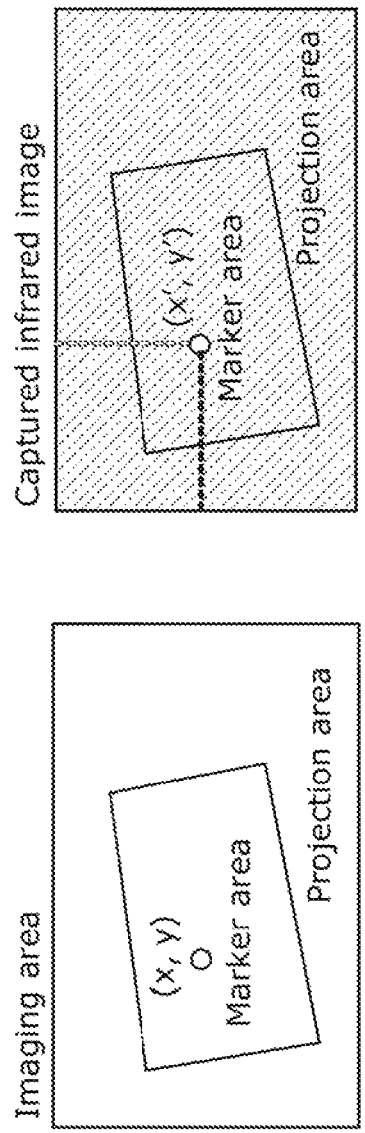
FIG. 4 illustrates an issue in projection control of the high-speed projection mapping system.

An issue in projection control in high-speed projection mapping is described below. FIG. 4 illustrates an issue in projection control of the high-speed projection mapping system. As illustrated in FIG. 4, an imaging area which is the imaging range of camera 40 includes a projection area which is the projection range of projector 20, Projection control device 10 intends to project an image onto a marker area positioned at the coordinates (x, y) in a coordinate system in the projection area (projection coordinate system). Here, the marker area is the area at which marker 50 is positioned, marker 50 having been sensed by camera 40 performing image capturing.

However, when sensing marker 50, projection control device 10 uses an image captured by camera 40. Thus, the coordinates of sensed marker 50 are the coordinates (x', y') in a coordinate system in the image captured by camera 40 (camera coordinate system). Here, the image captured by projection control device 10 by using camera 40 to sense marker 50 is an infrared image. It should be noted that the image captured by projection control device 10 by using camera 40 to sense marker 50 may be a visible light image.

Thus, projection control device 10 converts the coordinates (x', y') of sensed marker 50 in the coordinate system in the image captured by camera 40 into the coordinates (x, y) in the coordinate system in the projection area.

[Coordinate Conversion]

Figure 5:
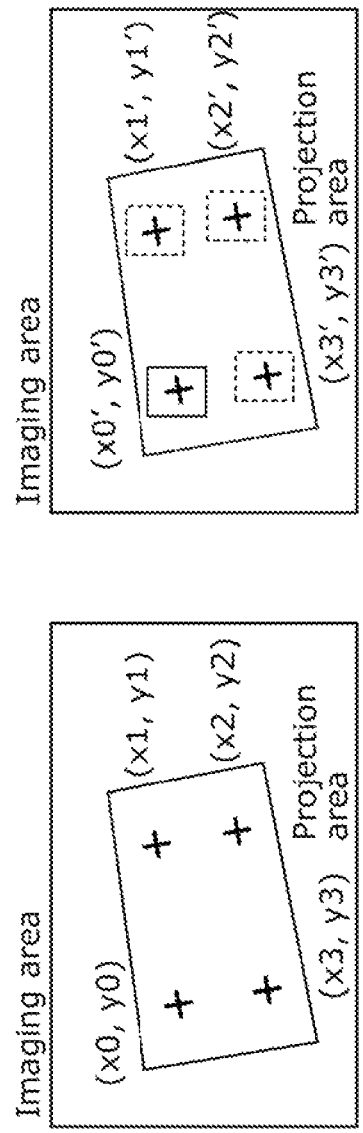
FIG. 5 illustrates an overview of a projection control method according to Embodiment 1.

Coordinate conversion performed by projection control device 10 is described below. FIG. 5 illustrates an overview of a projection control method according to Embodiment 1. First projection controller 11 of projection control device 10 causes projector 20 to project a projection image including projection indexes positioned within the projection range of projector 20. Here, the coordinates of the projection indexes in a coordinate system in a projection area (projection coordinate system) are known.

Display controller 14 of projection control device 10 causes display 30 to display a camera image on which camera indexes are superimposed. Here, the number of the camera indexes is the same as that of the projection indexes, and the camera indexes indicate positions relative to the projection indexes within a camera image. Camera coordinate detector 15 of projection control device 10 receives an operation to move, on display 30, one of the group of the projection indexes or the group of the camera indexes, the operation being performed by the user to adjust the positional relations between the projection indexes and the camera indexes, the projection indexes and the camera indexes being included in the camera image displayed on display 30. Thus, camera coordinate detector 15 obtains the coordinates of the projection indexes in the coordinate system in the image captured by camera 40 (camera coordinate system). Here, the user operation received by camera coordinate detector 15 may be, for example, superimposition of the projection indexes and the camera indexes which are included in the camera image displayed on display 30.

Through the operation, projection control device 10 obtains correspondence relations between the coordinates in the coordinate system in the image captured by camera 40 (camera coordinate system) and corresponding coordinates in the coordinate system in the projection area (projection coordinate system). Projection control device 10 obtains, from the correspondence relations, a conversion expression for converting the coordinates in the coordinate system in the image captured by camera 40 (camera coordinate system) into the corresponding coordinates in the coordinate system in the projection area (projection coordinate system). The conversion method of converting the coordinates in the coordinate system in the image captured by camera 40 (camera coordinate system) into the corresponding coordinates in the coordinate system in the projection area (projection coordinate system) may be linear interpolation, affine transformation, projective transformation, or other methods.

In addition, projection control device 10 may obtain, from the correspondence relations, a table used for converting the coordinates in the coordinate system in the image captured by camera 40 (camera coordinate system) into the corresponding coordinates in the coordinate system in the projection area (projection coordinate system).

[Projection Control Method]

Figure 6:
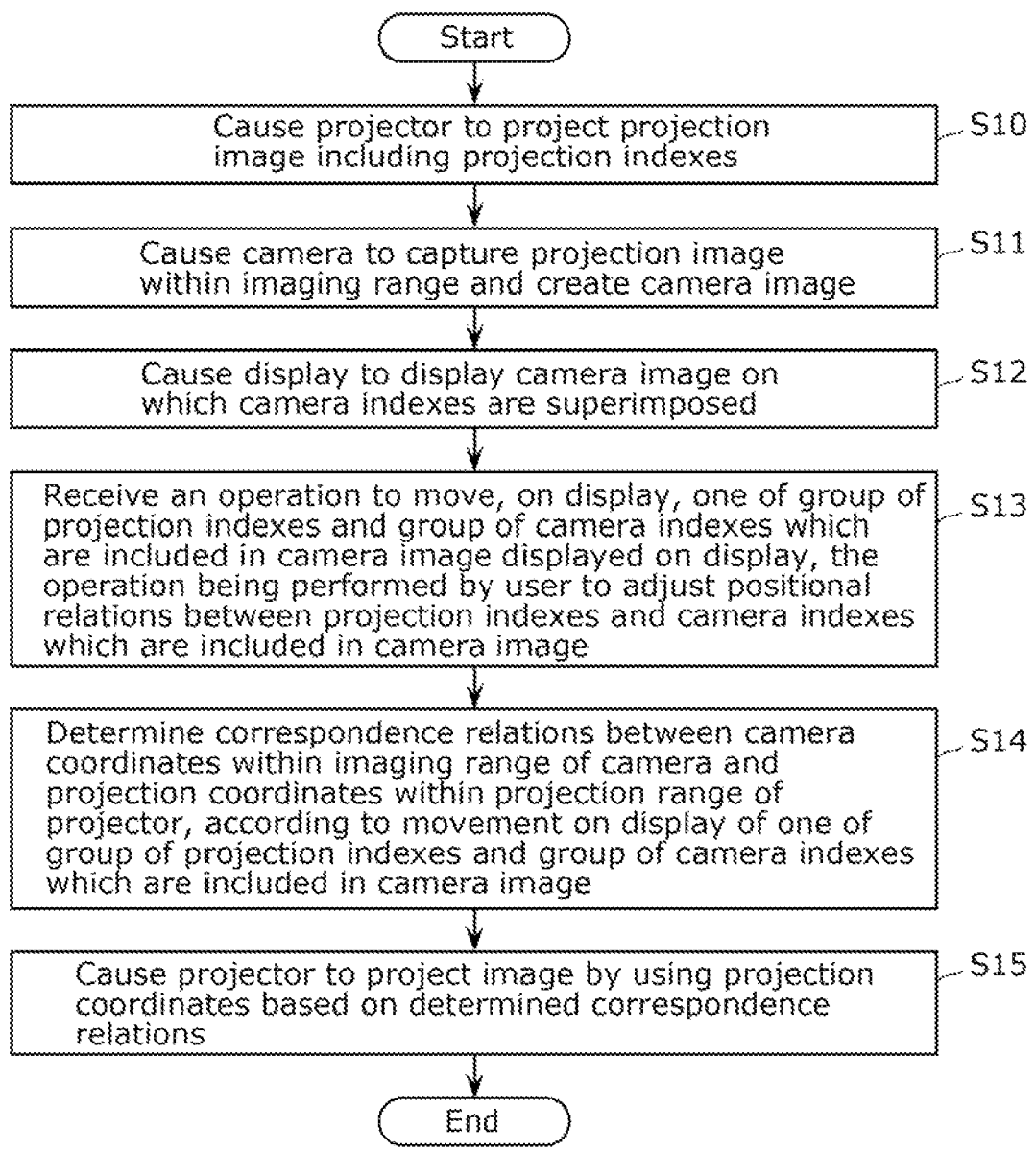
FIG. 6 is a flowchart of the projection control method according to Embodiment 1.

A projection control method performed by projection control device 10 is described below. FIG. 6 is a flowchart of the projection control method according to Embodiment 1.

First projection controller 11 causes projector 20 to project a projection image including projection indexes (step S10), Here, the number of the projection indexes may be three or four. The projection indexes may be cross-shaped, circular, or rectangular. The projection indexes may take other shapes.

Detection controller 13 causes camera 40 to capture the projection image within the imaging range and generates a camera image (step S11). Here, camera 40 may be an infrared camera or a visible light camera. The camera image may be an infrared image or a visible light image.

Display controller 14 causes display 30 to display the camera image on which camera indexes are superimposed (step S12).

Camera coordinate detector 15 receives an operation to move, on display 30, one of the group of the projection indexes or the group of the camera indexes, the operation being performed by the user to adjust the positional relations between the projection indexes and the camera indexes, the projection indexes and the camera indexes being included in the camera image displayed on display 30 (step S13).

Here, for instance, the adjustment of the positional relations between the projection indexes and the camera indexes which are included in the camera image displayed on display 30 is superimposition of the projection indexes and the camera indexes which are included in the camera image displayed on display 30. It should be noted that the projection indexes and the camera indexes which are included in the camera image displayed on display 30 do not have to completely overlap each other.

To adjust the positional relations between the projection indexes and the camera indexes which are included in the camera image displayed on display 30 may be, for instance, to decrease the distances between the projection indexes and the camera indexes which are included in the camera image displayed on display 30, to a predetermined distance or less. It should be noted that to adjust the positional relations between the projection indexes and the camera indexes which are included in the camera image displayed on display 30 may be to move the projection indexes within the projection image and/or move the camera indexes displayed on display 30.

In addition, camera coordinate detector 15 may receive an operation to move the camera indexes after the positions of the projection indexes positioned within the projection range are changed.

According to the movement on display 30 of one of the group of the projection indexes or the group of the camera indexes, controller 16 may determine correspondence relations between the camera coordinates within the imaging range of camera 40 and the projection coordinates within the projection range of projector 20, the projection indexes and the camera indexes being included in the camera image (step S14).

Thus, according to the correspondence relations between the camera coordinates within the imaging range of camera 40 and the projection coordinates within the projection range of projector 20, controller 16 obtains a conversion expression for converting the coordinates in the coordinate system in the image captured by camera 40 (camera coordinate system) into the corresponding coordinates in the coordinate system in the projection area (projection coordinate system). Instead of obtaining the conversion expression, controller 16 may obtain a table showing the correspondence relations. When, for instance, there are four projection indexes and four camera indexes, controller 16 may associate the four projection indexes with the four camera indexes by projective transformation.

Second projection controller 12 causes projector 20 to project an image, by using the projection coordinates based on the determined correspondence relations (step S15). For instance, by using the conversion expression obtained in step S14, second projection controller 12 obtains corresponding projection coordinates positioned within the projection range of projector 20 from the camera coordinates positioned within the imaging range of camera 40 and projects an image onto the obtained projection coordinates. By using the conversion expression obtained in step S14, second projection controller 12 may convert coordinates in a coordinate system in an image obtained by camera 40 capturing a projection target image (camera coordinate system) into coordinates in a coordinate system in a projection area (projection coordinate system) and project the projection target image.

[Calibration and Content Reproduction]

Figure 7:
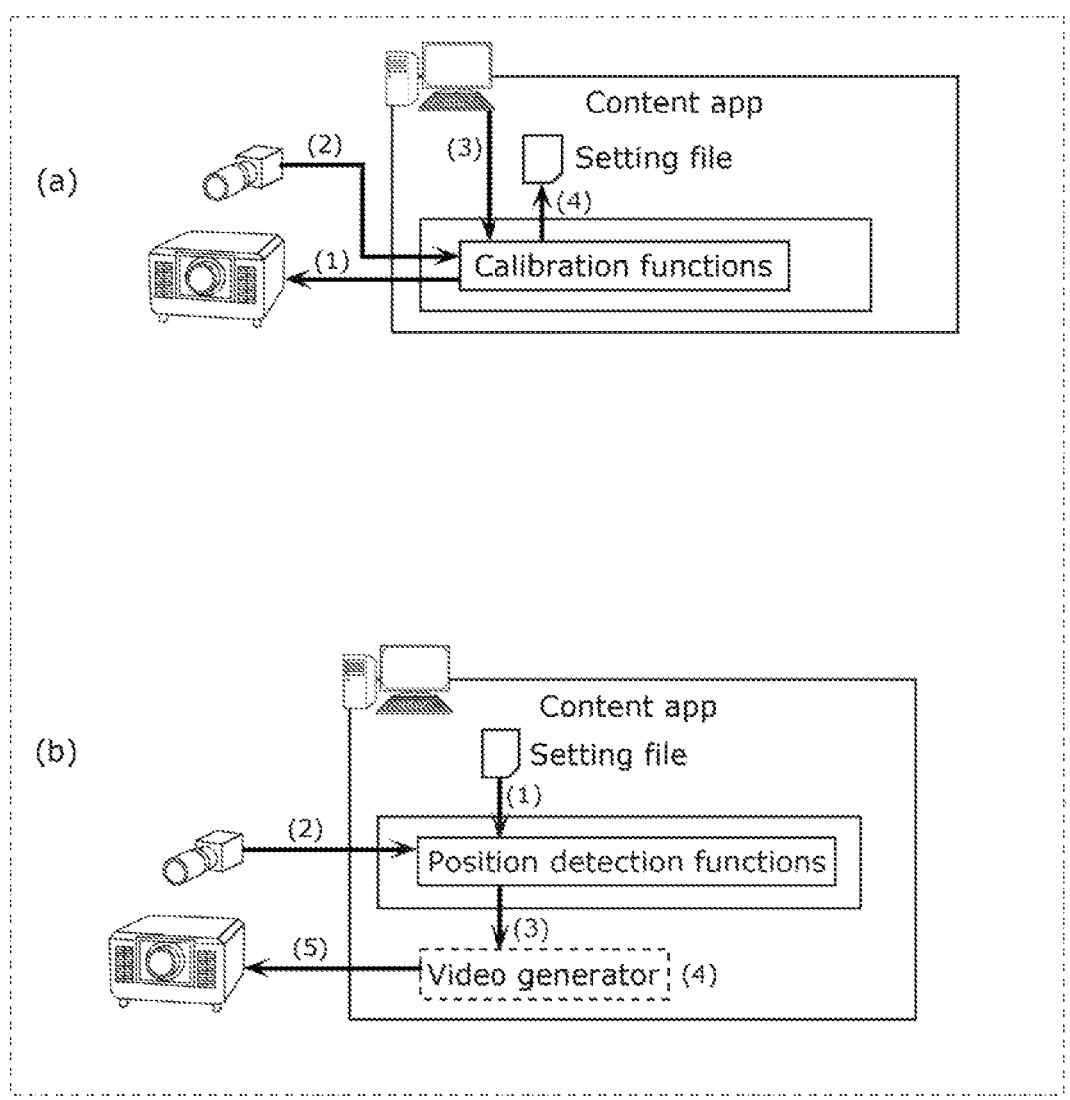
FIG. 7 illustrates an overview of image projection using the projection control method according to Embodiment 1.

Application of the projection control method according to Embodiment 1 to high-speed projection mapping is described below. FIG. 7 illustrates an overview of image projection using the projection control method according to Embodiment 1. The projection control method according to Embodiment 1 described with reference to FIG. 6 is applied to high-speed projection mapping, as described below.

Calibration performed in the high-speed projection mapping is described. Regarding (1) illustrated in (a) in FIG. 7, projection control device 10 outputs a projection image for calibration. Here, calibration means positioning of a projected image, performed by projection control device 10 to project an image by using projector 20. The parts of projection control device 10 that perform a series of calibration processing steps are referred to as calibration functions.

Regarding (2) illustrated in (a) in FIG. 7, projection control device 10 obtains a camera image captured by camera 40. Regarding (3) illustrated in (a) in FIG. 7, projection control device 10 performs a calibration operation. The calibration operation described in (3) illustrated in (a) in FIG. 7 primarily corresponds to the processing performed in steps S12 to S14 described with reference to FIG. 6.

Regarding (4) illustrated in (a) in FIG. 7, projection control device 10 creates a setting file regarding the correspondence relations between camera coordinates within the imaging range of camera 40 and projection coordinates within the projection range of projector 20, the correspondence relations having been obtained as a result of the calibration operation. The setting file created by the calibration functions is output to position detection functions, which are described below.

The position detection functions are the parts of the high-speed projection mapping system that perform a series of processing steps to detect the position of marker 50 when content is reproduced in high-speed projection mapping. Projection control device 10 may or may not include the position detection functions.

Regarding (1) illustrated in (b) in FIG. 7, the position detection functions read the setting file created by the calibration functions. Regarding (2) illustrated in (b) in FIG. 7, the position detection functions obtain the camera image including marker 50 and captured by camera 40. Regarding (3) illustrated in (b) in FIG. 7, on the basis of the setting file, the position detection functions obtain the coordinates of marker 50 from the obtained camera image and converts the coordinates of marker 50 into projection coordinates. The position detection functions then provide a video generator with the projection coordinates. The video generator generates an image that is used in high-speed projection mapping and caused to track marker 50. Regarding (4) illustrated in (b) in FIG. 7, the video generator generates a tracking video which is a video caused to track marker 50. Regarding (5) illustrated in (b) in FIG. 7, the video generator outputs the tracking video generated by the video generator.

[Implementation of Projection Control Method]

Figure 8A:
FIG. 8A illustrates a sensing area for image projection using the projection control method according to Embodiment 1.

An example when the projection control method according to Embodiment 1 is performed is described. Projection control device 10 determines the area to be sensed by camera 40. Here, sensing means detection of marker 50 by using an image captured by camera 40. FIG. 8A illustrates a sensing area for image projection using the projection control method according to Embodiment 1. For instance, the largest rectangular area illustrated in FIG. 8A is considered as the sensing area used for sensing. Projection control device 10 determines the size of the target area for sensing within the area in which image capturing by camera 40 is possible. The area is, for example, an area of 768×360 pixels.

In addition, projection control device 10 determines a coordinate system in the area. For instance, projection control 15 device 10 may set the upper left corner of the area to (x, y)=(0, 0).

Then, projection control device 10 adjusts the size and position of the sensing area to cause projection indexes included in a projection image to be within the sensing area. Here, the projection image is a rectangle including four cross-shaped marks and is split into four areas. For instance, as illustrated in FIG. 8A, projection control device 10 adjusts the size and position of the sensing area to cause the projection indexes to be within the sensing area. Here, the size and position of the projection image may be adjusted. For instance, the projection indexes may be cross-shaped marks as illustrated in FIG. 8A. In addition, the four projection indexes are separately positioned inside the four rectangles.

Figure 8B:
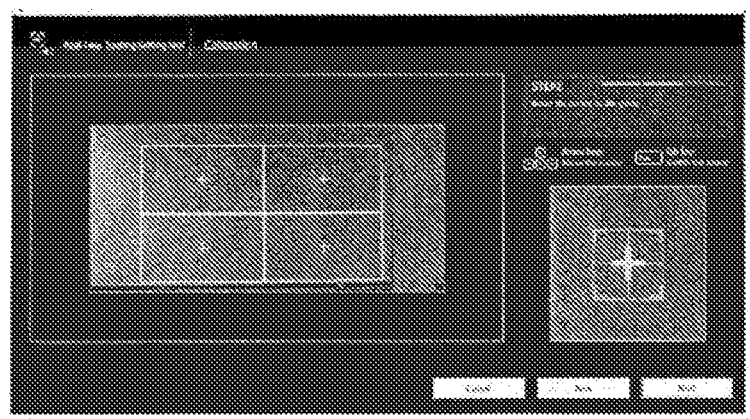
FIG. 8B illustrates calibration for image projection using the projection control method according to Embodiment 1.

Projection control device 10 associates the camera coordinates with the projection coordinates. FIG. 8B illustrates calibration for image projection using the projection control method according to Embodiment 1.

In Embodiment 1, four default camera indexes, which are camera indexes before reception of a user operation to move the camera indexes, are separately positioned inside four areas obtained by horizontally splitting the camera image into two halves and vertically splitting the camera image into two halves.

Projection control device 10 receives a user operation to move the positions of the camera indexes to cause the positions of the camera indexes to coincide with the positions of the corresponding projection indexes. Here, the camera indexes are square cursors including a cross-shaped mark inside. For instance, the camera indexes are moved vertically and horizontally when the arrow keys of the keyboard of a computer are pressed. It should be noted that the camera indexes may be vertically and horizontally moved by click and drag of a mouse. The four areas of the projection image each include a projection index, and the four areas of the camera image each include a camera index. When the position of an area of the projection image is the same as the position of an area of the camera image, the projection index in the area of the projection image corresponds to the camera index in the area of the camera image.

When selecting each of the camera indexes, switching may be performed by pressing a tab key. It should be noted that when selecting each of the camera indexes, switching may be performed through a click operation of a mouse.

Here, projection control device 10 causes display 30 to display the camera image in the coordinate system in the image captured by camera 40 (camera coordinate system). Here, the camera image is a visible light image.

Figure 8C:
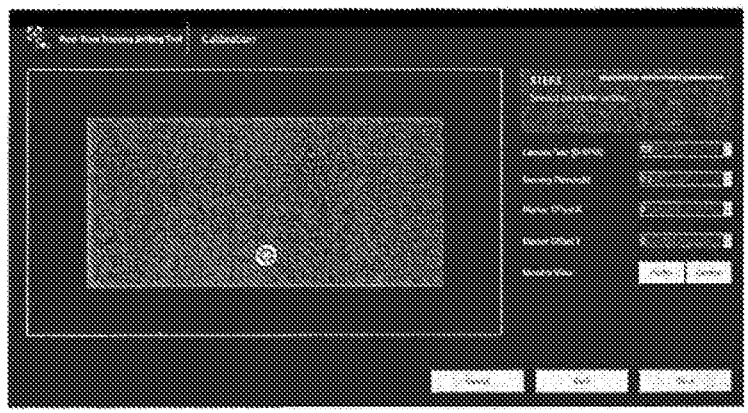
FIG. 8C illustrates parameter settings for image projection using the projection control method according to Embodiment 1.

Projection control device 10 performs parameter settings (calibration) for sensing marker 50. FIG. 8C illustrates parameter settings for image projection using the projection control method according to Embodiment 1.

Projection control device 10 captures an infrared image in a state in which a visible light cut filter is attached in front of the camera lens of camera 40. The infrared image may be referred to as a marker image. Here, marker 50 is positioned so as to appear in the sensing area described with reference to FIG. 8A.

By adjusting the camera gain, projection control device 10 adjusts the brightness of the infrared image captured by camera 40.

Projection control device 10 performs adjustment, for an image obtained by performing binarization processing for the infrared image, so that only the portion showing marker 50 is displayed brightly. For instance, projection control device 10 brightly (e.g., in red) displays a portion of the image having a value higher than a threshold and darkly (e.g., in a color other than red) displays a portion of the image having a value lower than the threshold. The adjustment performed by projection control device 10 for the image obtained by performing the binarization processing for the infrared image, to cause only the portion showing marker 50 to be displayed brightly may be adjustment performed by projection control device 10 to cause only the portion showing marker 50 to be displayed in red. Here, projection control device 10 adjusts the threshold used in the binarization processing performed for the infrared image, to cause only the portion showing marker 50 to be displayed brightly (to cut out the marker area). Here, in the order from high reflection of light to low reflection of light, the portions of the image may be displayed in the order of red, yellow, green, and blue.

Embodiment 2

[Projection Control Device Including Cameras]

FIG. 9 illustrates a configuration of projection control device 10 according to Embodiment 2. Projection control device 10 may be connected via LAN cables 60 to cameras 40*a*, 40*b*, and 40*c*. Cameras 40*a*, 40*b*, and 40*c* are connected via LAN cables 60 to PoE power supply compatible hub 70. PoE power supply compatible hub 70 is connected via LAN cable 60 to projection control device 10. It should be noted that the cameras are not limited to the three cameras: cameras 40*a*, 40*b*, and 40*c*. As long as more than one camera is provided, the number of the cameras may be any number.

Cameras 40*a*, 40*b*, and 40*c* emit infrared light toward marker 50. Cameras 40*a*, 40*b*, and 40*c* then capture an image of marker 50 which has reflected the infrared light. Here, marker 50 is a retroreflective marker.

Camera coordinate detector 15 detects the position of marker 50, for which image capturing has been performed by cameras 40*a*, 40*b*, and 40*c*. By using dedicated software, camera coordinate detector 15 may detect the position of marker 50, for which the image capturing has been performed by cameras 40*a* to 40*n*.

According to the relative positional relations between projection indexes and camera indexes, controller 16 determines correspondence relations between camera coordinates within the imaging range of each camera and projection coordinates within the projection range of the projector. That is, controller 16 performs coordinate conversion of the camera coordinates. Controller 16 then creates content to be projected by projector 20, on the basis of the converted camera coordinates. Projector 20 projects the content transmitted from controller 16.

Figure 10:
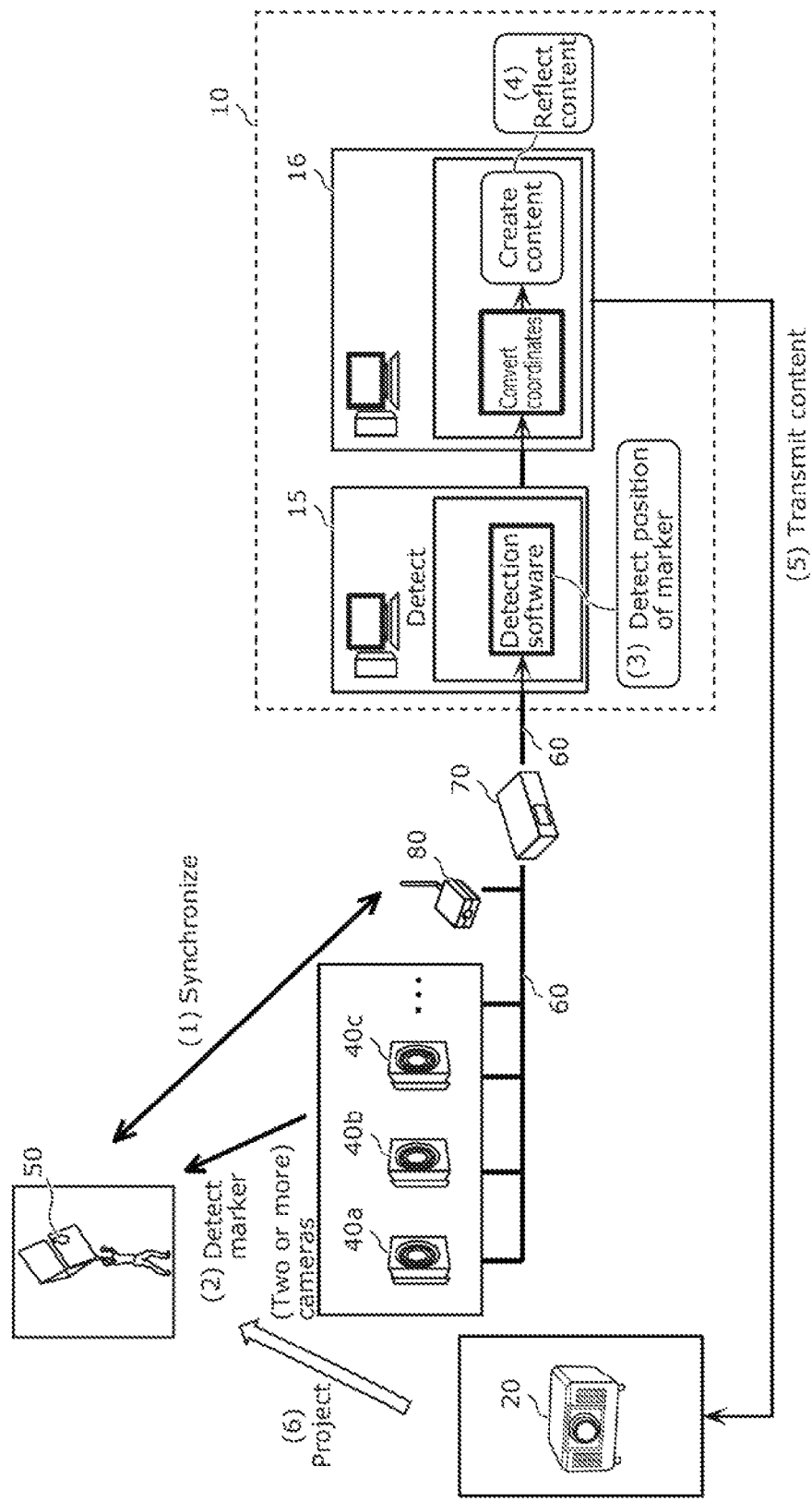
FIG. 10 illustrates another configuration of the projection control device according to Embodiment 2.

FIG. 10 illustrates another configuration of projection control device 10 according to Embodiment 2. Projection control device 10 may be connected via LAN cables 60 to cameras 40*a*, 40*b*, and 40*c*. In the configuration described in FIG. 10, marker 50 is an infrared LED marker, and marker 50 itself emits light. In addition, projection control device 10 is connected via cable 60 to synchronizing signal transmitter 80. The other portions of the configuration are similar to the corresponding portions of the configuration described with reference to FIG. 9.

Marker 50 emits light. A user may set marker 50 at a given position and cause marker 50 to emit light. Cameras 40*a*, 40*b*, and 40*c* capture an image of marker 50 emitting light.

Camera coordinate detector 15 detects the position of marker 50, for which image capturing has been performed by cameras 40*a*, 40*b*, and 40*c*. Here, camera coordinate detector 15 synchronizes with marker 50 via synchronizing signal transmitter 80. Specifically, marker 50 receives a synchronizing signal transmitted from synchronizing signal transmitter 80 and emits light in accordance with the synchronizing signal, which synchronizes marker 50 and camera coordinate detector 15. By using dedicated software, camera coordinate detector 15 may detect the position of marker 50, for which the image capturing has been performed by cameras 40*a*, 40*b*, and 40*c*.

By using LEDs and causing, by using a synchronizing signal, each of the LEDs to emit pulsed light in a different pattern, it is possible to assign a unique ID to the marker. If assignment of the ID is not necessary, the synchronizing signal does not have to be transmitted and received.

According to the relative positional relations between projection indexes and camera indexes, controller 16 determines the correspondence relations between camera coordinates within the imaging range of each camera and projection coordinates within the projection range of the projector, That is, controller 16 performs coordinate conversion of the camera coordinates. Controller 16 then creates content to be projected by projector 20, on the basis of the converted camera coordinates. In accordance with control of second projection controller 12, projector 20 projects the content transmitted from controller 16.

Figure 11:
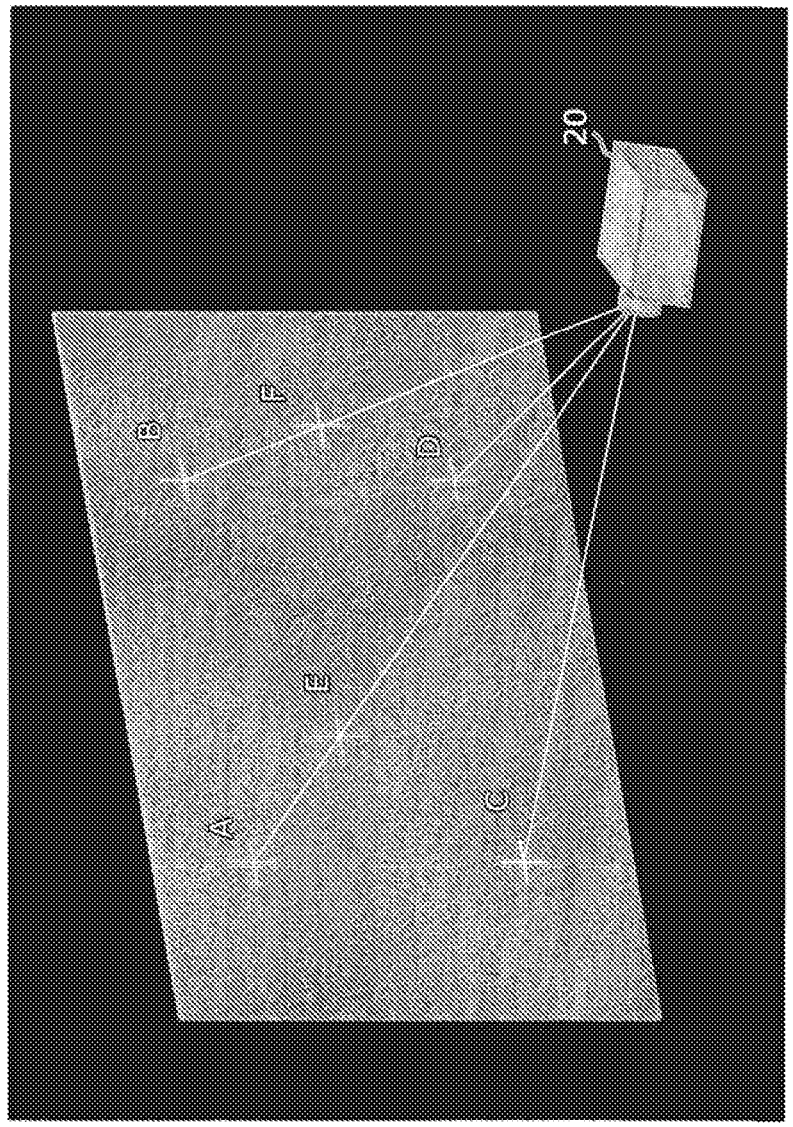
FIG. 11 illustrates projection of projection indexes by the projection control device according to Embodiment 2.

FIG. 11 illustrates projection of projection indexes by projection control device 10 according to Embodiment 2. Projection control device 10 obtains the coordinates of four points on the same plane and the coordinates of two points on planes different from the plane onto which the four points are projected. Specifically, display controller 14 of projection control device 10 causes projector 20 to project four projection indexes onto the same plane, such as a screen.

Cameras 40*a*, 40*b*, and 40*c* capture images of markers 50 set on the projection indexes by the user. Camera coordinate detector 15 detects the position coordinates of markers 50, for which image capturing has been performed by cameras 40*a*, 40*b*, and 40*c*.

Projection control device 10 performs similar processing for the two points on the planes different from the plane onto which the four points are projected. Specifically, display controller 14 of projection control device 10 projects each of two projection indexes onto a space on a plane different from the plane onto which the four points are projected. For instance, display controller 14 may cause projector 20 to project the projection indexes onto boards set by the user.

Cameras 40*a*, 40*b*, and 40*c* capture an image of each marker 50 provided on a board set by the user. Camera coordinate detector 15 detects the position coordinates of marker 50, for which image capturing has been performed by cameras 40*a*, 40*b*, and 40*c*. The position coordinates are three-dimensional coordinates in the space where the cameras are set. The three-dimensional coordinates can be obtained by causing more than one camera to perform image capturing and using stereoscopic analysis or other methods.

For instance, by using the detected coordinates of the projection indexes projected onto the positions of four points A, B, C, and D, controller 16 obtains a calculation expression for correcting the position of a reference point, inconsistency in the degree of rotation, and inconsistency in the sizes of the projection indexes. The calculation expression is, for example, affine transformation. By using the detected coordinates of the projection indexes projected onto the positions of four points A, B, C, and D, controller 16 obtains a calculation expression for removing distortion of projection by projector 20. The calculation expression is, for example, projective transformation.

By using the detected coordinates of the projection indexes projected onto the positions of four points A, B, F, and F, controller 16, for instance, obtains the setting position of projector 20 and the setting state of the position or the angle of view. In addition, by taking the shapes of four points A, B, C, and D into consideration, controller 16 obtains a calculation expression indicating the projection direction and lens shift.

Figure 12:
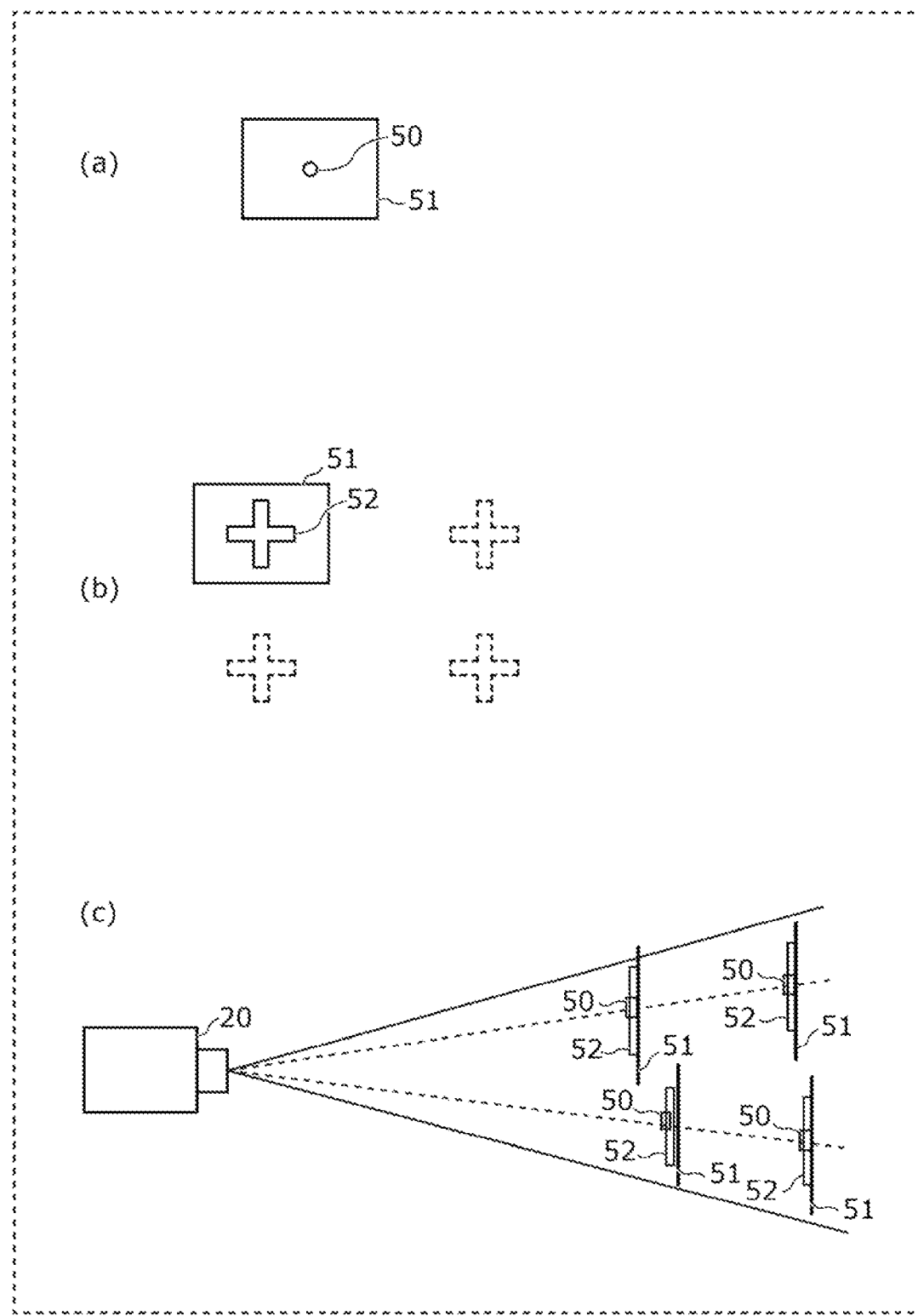
FIG. 12 illustrates an overview of a projection control method according to Embodiment 2.

FIG. 12 illustrates an overview of a projection control method according to Embodiment 2. As illustrated in (a) in FIG. 12, the user positions marker 50 provided on board 51 at the position specified by display controller 14.

As illustrated in (b) in FIG. 12, display controller 14 instructs the user where to position marker 50, by causing projector 20 to project projection index 52 at a predetermined position. As illustrated in (b) in FIG. 12, display controller 14 may project two or more projection indexes. The two or more projection indexes are, for example, four projection indexes.

Display controller 14 may project four projection indexes onto the same plane, such as a screen, and two more projection indexes onto planes different from the plane onto which the four projection indexes are projected. Display controller 14 may simultaneously project the projection indexes or project one by one in order.

The user positions marker 50 provided on board 51 at the position of a projected projection index. Here, marker 50 is detectable by the infrared camera. Camera coordinate detector 15 detects the position of marker 50, for which image capturing has been performed by cameras 40a to 40n. Camera coordinate detector 15 performs marker 50 detection processing for the four points within the same plane. Controller 16 performs projection control for projector 20 by using relations between the coordinates of markers 50 detected by camera coordinate detector 15 and the coordinates of the projection indexes on a projection image which display controller 14 has caused projector 20 to project.

As illustrated in (c) in FIG. 12, regarding each of two projection indexes among the four projection indexes projected onto the same plane, the user positions marker 50 on a plane different from the plane onto which the four projection indexes are projected. Specifically, the user positions marker 50 provided on board 51, on a point on the straight line connecting projector 20 to one of the four projection indexes projected onto the plane, the point being on a plane different from the plane onto which four projection indexes are projected.

Then, camera coordinate detector 15 detects the coordinates of markers 50 positioned at the two points. Second projection controller 12 detects the position of projector 20 by using relations between the coordinates of markers 50 positioned at the two points and the coordinates of the projection indexes on the projection image which display controller 14 has caused projector 20 to project. This enables second projection controller 12 to perform projection control for projector 20.

That is, by using the detected position of projector 20, second projection controller 12 adjusts the projection image to be projected by projector 20 and controls video projection operation of projector 20. Here, the video projection operation may be control of the position or size of content to be projected.

[Operation of Projection Control Device Including Cameras]

Figure 13:
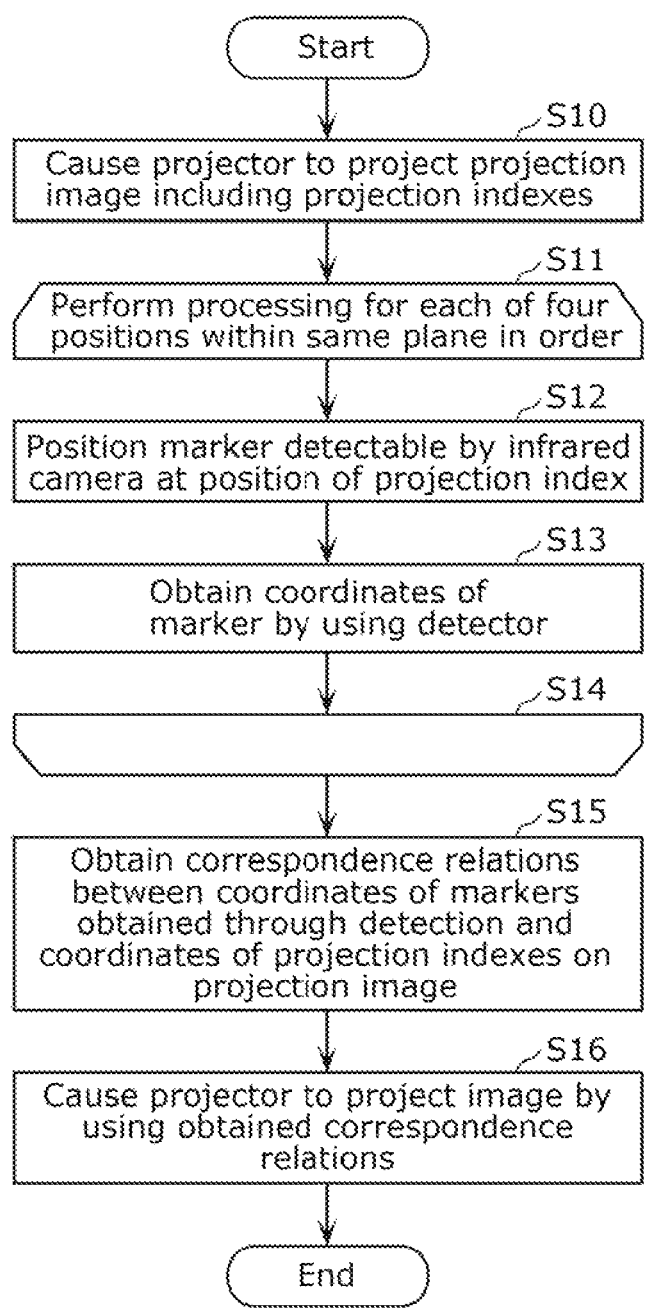
FIG. 13 is a flowchart of the projection control method according to Embodiment 2.

Operation of projection control device 10 according to Embodiment 2 is described below. FIG. 13 is a flowchart of the projection control method according to Embodiment 2.

Display controller 14 causes projector 20 to project a projection image including projection indexes (step S10). Display controller 14 may sequentially project the projection indexes onto four points within the same plane. It should be noted that the positions at which the projection indexes are projected do not have to be fixed. The positions at which the projection indexes are projected may be changed to given positions.

Steps S12 and S13 described below are performed for each of the four points within the same plane (step S11).

The user positions marker 50 detectable by camera 40 at the position of a projection index (step S12). The user positions, on the plane onto which the projection indexes are projected, board 51 on which marker 50 is provided. Here, the plane onto which the projection indexes are projected may be, for example, a screen.

By using a detector, camera coordinate detector 15 obtains the coordinates of marker 50 (step S13). Camera coordinate detector 15 detects the position of marker 50 by using, for example, an infrared camera.

The processing returns to step S11 (step S14).

It should be noted that the plane onto which the projection indexes are projected may be an empty space. In this case, if, for example, marks are on a floor to indicate the plane to position boards 51, the user positions boards 51 according to the marks. In this way, the four points at which the user positioned markers 50 are distributed on substantially the same plane.

Controller 16 obtains correspondence relations between the coordinates of markers 50 obtained through the detection and the coordinates of the projection indexes on the projection image (step S15). Controller 16 obtains correspondence relations between the coordinates of markers 50 positioned by the user, which have been detected by camera coordinate detector 15, and the coordinates of the projection indexes on the projection image which display controller 14 has caused projector 20 to project. That is, controller 16 obtains a relation showing that the coordinates of the content which controller 16 causes projector 20 to project correspond to which coordinates in the real space.

Second projection controller 12 causes projector 20 to project an image by using the obtained correspondence relations (step S16).

It should be noted that if camera 40 has the function of a visible light camera, the user does not have to manually position markers 50. By projecting, onto an existing plane such as a screen, the four projection indexes projected onto the same plane, controller 16 detects the positions of the projected projection indexes from an image captured by camera 40 serving as a visible light camera. In this way, controller 16 can detect correspondence relations between the coordinates of markers 50 and the coordinates of the projection indexes on the projection image. By providing boards 51 for the two points, among the four points, projected onto planes different from the plane onto which the four points are projected, controller 16 detects the positions of the projected projection indexes from an image captured by camera 40 serving as the visible light camera. In this way, controller 16 can detect correspondence relations between the coordinates of markers 50 and the coordinates of the projection indexes on the projection image. Here, marker 50 does not have to be provided on board 51.

Here, in camera 40, the function of the infrared camera and the function of the visible light camera may be switchable.

In addition, controller 16 may cause projector 20 to project the four projection indexes onto the same plane while moving the four projection indexes to cause the positions of the four projection indexes to coincide with the positions of markers 50 prepositioned on an existing plane, such as a screen, onto which the four points are to be projected. Controller 16 uses the two points among the four points and detects the positions of the two points projected, the two points being projected onto planes different from the plane onto which the four points are projected. In this way, controller 16 may obtain correspondence relations between the coordinates of markers 50 and the coordinates of the projection indexes on the projection image.

Figure 14:
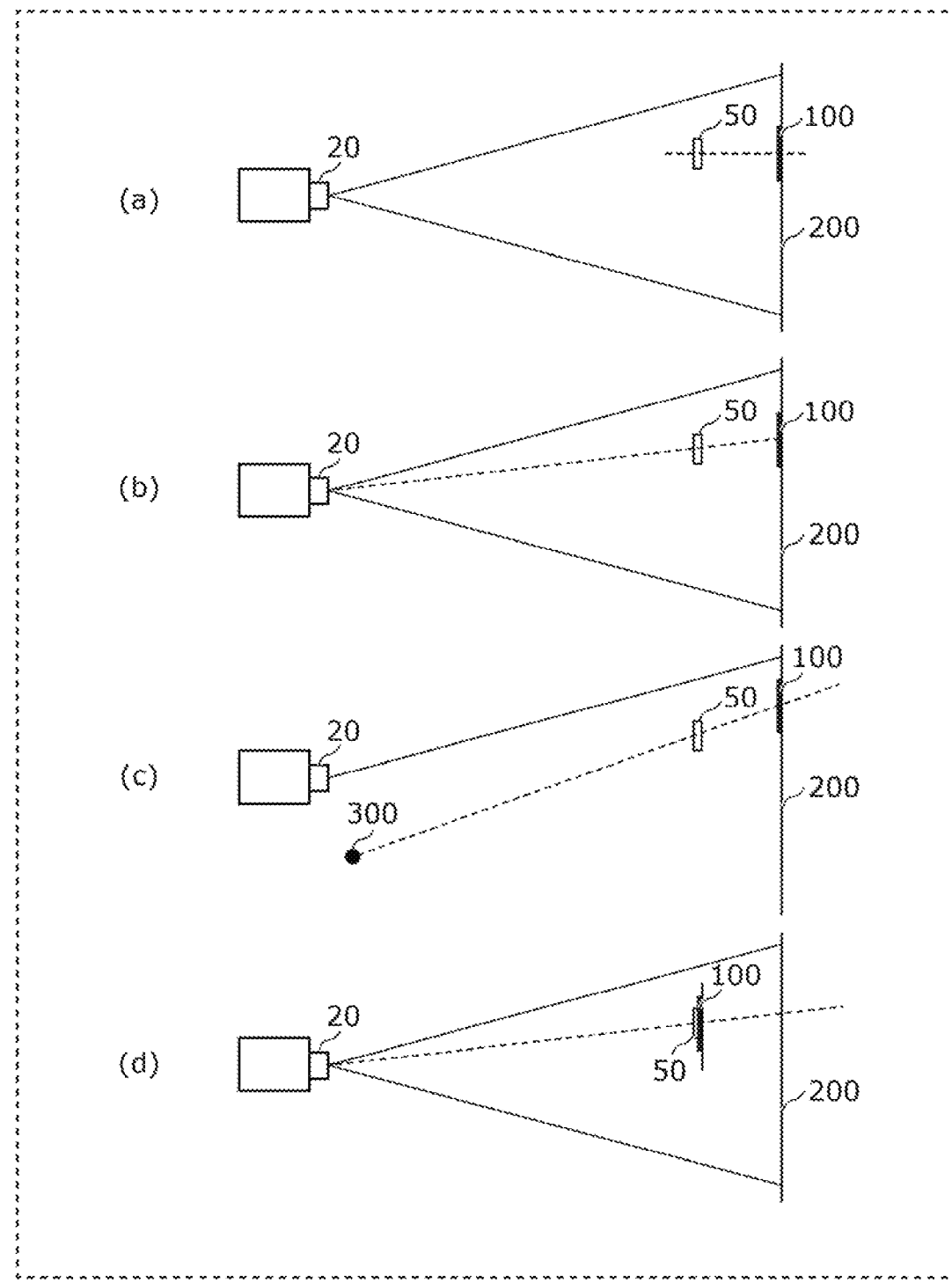
FIG. 14 illustrates methods of projecting a projection image.

Methods of projecting a projection image performed by projector 20 controlled by second projection controller 12 are described below. FIG. 14 illustrates methods of projecting a projection image.

As illustrated in (a) in FIG. 14, in parallel projection, an image is projected onto the perpendicular foot of the line from marker 50 to screen 200. In parallel projection, even if marker 50 is distant from screen 200, the position of marker 50 coincides with the position of projection image 100 in front of an audience.

As illustrated in (b) in FIG. 14, in perspective projection, an image is projected onto the point at which the extension of the straight line connecting projector 20 to marker 50 passes through screen 200. In perspective projection, the audience close to projector 20 can visually recognize the projected image in a state in which the position of marker 50 relatively overlaps the position of projection image 100.

As illustrated in (c) in FIG. 14, in virtual-viewpoint projection, an image is projected onto the point at which the extension of the straight line connecting specific virtual viewpoint 300 to marker 50 passes through screen 200. Here, specific virtual viewpoint 300 is a viewpoint set at a predetermined position. When a camera is set at the setting position of virtual viewpoint 300, the position of marker 50 and the position of projection image 100 always coincide when viewed from the camera.

As illustrated in (d) in FIG. 14, in object mapping, an image is projected onto an object on which marker 50 is provided. Here, the object is, for example, a plate-like object or someone's body. In addition, the object may be a building or a traveling object. In object mapping, projection image 100 is projected onto a point on the straight line connecting projector 20 to marker 50. For instance, the size of projection image 100 is changed according to the distance between projector 20 and marker 50. In object mapping, projection image 100, when viewed from the audience, appear to track the object on which marker 50 is provided.

In the projection methods described with reference to (a) to (d) in FIG. 14, screen 200 may be set in front of marker 50 when viewed from projector 20. In this case, screen 200 may be made of a translucent material. The translucent material may be, for example, a mesh material or a transparent plate containing diffusion particles.

It should be noted that in the projection method in (d) in FIG. 14, in the case where screen 200 is set in front of marker 50 when viewed from projector 20, if the transmittance of the translucent material is sufficiently high, even after light transmits through the screen, video can be projected onto the object without giving discomfort. The transmittance of the translucent material should be 90% or higher, Preferable transmittance is around 95%. Even if such a screen having a high transmittance and a low reflectance is used, the projected video is visually recognizable. However, the video projected onto the object set behind the screen is brighter than the video reflected by the translucent screen. Thus, the video projected onto the object is primarily visually recognized.

Depending on which one of the four projection methods, which are described with reference to (a) to (d) in FIG. 14, is used, controller 16 may be able to switch between the following processing operations. Controller 16 detects correspondence relations between the coordinates of markers 50 and the coordinates of projection indexes on projection image 100, by detecting only the positions of the projected projection indexes of four points projected onto the same plane. Alternatively, controller 16 detects correspondence relations between the coordinates of markers 50 and the coordinates of the projection indexes on projection image 100, by detecting the positions of the projected projection indexes of two points among the four points, as well as the positions of the projected projection indexes of the four points. Here, the two points are projected onto planes different from the plane onto which the four points are projected. Controller 16 may be able to determine which of the two processing operations is to be performed.

It should be noted that depending on which one of the four projection methods, which are described with reference to (a) to (d) in FIG. 14, is used, display controller 14 may change the projection mode of projection image 100 between the first to fourth modes on the basis of the correspondence relations between the coordinates of markers 50 and the coordinates of the projection indexes on projection image 100, obtained by controller 16. In the projection mode switching, for instance, the size of projection image 100, the angle, the distance to the projection target may be changed for the same source content.

It should be noted that the projection modes are not limited to the four modes. As long as there are two or more projection modes, the number of projection modes may be any number. For instance, two or three projection modes may be provided.

Effects

A projection control method according to an embodiment of the present disclosure is a projection control method performed by a processor to control projection of an image by projector 20. The projection control method includes causing projector 20 to project a projection image including projection indexes positioned within the projection range of projector 20, causing camera 40 to capture the projection image within an imaging range, causing a display to display an instruction for a user to position camera indexes within the imaging range, the camera indexes indicating positions relative to the projection indexes in a camera coordinate system obtained by capturing the projection image, detecting camera coordinates which are the coordinates of the camera indexes positioned, and determining, according to relative positional relations between the projection indexes and the camera indexes, the correspondence relations between the camera coordinates within the imaging range of camera 40 and projection coordinates within the projection range of projector 20.

Thus, by performing the projection control method according to the embodiment of the present disclosure, the position of projector 20 and the position of camera 40 can be associated in a simple structure.

For instance, the projection control method according to the embodiment of the present disclosure may further include causing projector 20 to project the image, by using the projection coordinates based on the correspondence relations determined.

Thus, by performing the projection control method according to the embodiment of the present disclosure, it is possible to project an image in which the position of projector 20 and the position of camera 40 are properly associated.

In the detecting of the projection control method according to the embodiment of the present disclosure, an operation to move one of the group of the projection indexes or the group of the camera indexes on the display is received, the operation being performed by the user to adjust positional relations between the projection indexes and the camera indexes, the projection indexes and the camera indexes being included in a camera image displayed on the display.

Thus, by performing the projection control method according to the embodiment of the present disclosure, the position of projector 20 and the position of camera 40 can be associated in a simple structure.

For instance, in the projection control method according to the embodiment of the present disclosure, the operation may be a user operation to move, on display 30, the projection indexes included in the camera image, to adjust the positional relations between the projection indexes and the camera indexes which are included in the camera image displayed on display 30.

Thus, by performing the projection control method according to the embodiment of the present disclosure, the projection indexes included in the camera image can be associated with the camera indexes.

For instance, the projection control method according to the embodiment of the present disclosure, the operation may be a user operation to move the camera indexes on display 30, to adjust the positional relations between the projection indexes and the camera indexes which are included in the camera image displayed on display 30.

Thus, by performing the projection control method according to the embodiment of the present disclosure, the camera indexes can be associated with the projection indexes included in the camera image.

For instance, the projection control method according to the embodiment of the present disclosure, adjustment, by the user, of the positional relations between the projection indexes and the camera indexes which are included in the camera image displayed on display 30 may be superimposition, by the user, of the projection indexes and the camera indexes which are included in the camera image displayed on display 30.

Thus, by performing the projection control method according to the embodiment of the present disclosure, it is possible to properly associate the coordinates in the image projected by the projector and the coordinates in the image captured by the camera.

For instance, in the projection control method according to the embodiment of the present disclosure, the projection indexes are four projection indexes, and the camera indexes are four camera indexes.

Thus, by performing the projection control method according to the embodiment of the present disclosure, the positions of the projection indexes and the positions of the camera indexes which are included in the camera image displayed on display 30 can be associated by projective transformation.

For instance, in the projection control method according to the embodiment of the present disclosure, the determining includes determining, by using the four projection indexes and the four camera indexes, the correspondence relations between the camera coordinates within the imaging range of camera 40 and the projection coordinates within the projection range of projector 20.

Thus, by performing the projection control method according to the embodiment of the present disclosure, calibration of the projection image of projector 20 can be performed using the four projection indexes.

For instance, in the projection control method according to the embodiment of the present disclosure, the projection indexes are six projection indexes, and the camera indexes are six camera indexes.

Thus, by using the specific two points in addition to the four points, for example, the position of projector 20 can be detected.

For instance, in the projection control method according to the embodiment of the present disclosure, the determining includes determining, by using the six projection indexes and the six camera indexes, the correspondence relations between the camera coordinates within the imaging range of camera 40 and the projection coordinates within the projection range of projector 20.

Thus, by performing the projection control method according to the embodiment of the present disclosure, calibration of the projection image of projector 20 can be performed using the six projection indexes.

For instance, the projection control method according to the embodiment of the present disclosure may further include causing camera 40 to capture an image of marker 50 present in the projection range, obtaining camera coordinates of marker 50 in the camera coordinate system in the image of marker 50 captured by camera 40, converting the camera coordinates of marker 50 into projection coordinates by using the correspondence relations determined, and causing projector 20 to project the image at the position of marker 50, by using the projection coordinates of marker 50 obtained through conversion, the position being the position of marker 50 when the image of marker 50 is captured by camera 40.

Thus, by performing the control method according to the embodiment of the present disclosure, the position of marker 50 can be detected, and the image can be projected on the basis of the position of marker 50.

For instance, in the projection control method according to the embodiment of the present disclosure, the camera image may be a visible light image, and the image of the marker may be an infrared image.

Thus, by performing the projection control method according to the embodiment of the present disclosure, the position of projector 20 and the position of camera 40 can be associated using both the visible light image and the infrared image.

For instance, in the projection control method according to the embodiment of the present disclosure, marker 50 may include an infrared reflective material.

Thus, by performing the projection control method according to the embodiment of the present disclosure, the position of the projector and the position of the camera can be associated by detecting marker 50 reflecting infrared light.

For instance, in the projection control method according to the embodiment of the present disclosure, marker 50 may include a light emitting diode (LED) and emit light.

Thus, by performing the projection control method according to the embodiment of the present disclosure, the position of projector 20 and the position of camera 40 can be associated by detecting light emitted from marker 50 which itself emits light.

For instance, the projection control method according to the embodiment of the present disclosure may further include moving the camera indexes after changing the positions of the projection indexes positioned within the projection range.

Thus, by performing the projection control method according to the embodiment of the present disclosure, the camera indexes can be moved after adjusting the positions of the projection indexes on the basis of the position of the screen. Thus, by performing the projection control method according to the embodiment of the present disclosure, the position of projector 20 and the position of camera 40 can be properly associated.

Projection control device 10 according to another embodiment of the present disclosure is projection control device 10 that controls projection of an image by projector 20. Projection control device 10 includes first projection controller 11 that causes projector 20 to project a projection image including projection indexes positioned within the projection range of projector 20, detection controller 13 that causes camera 40 to capture the projection image within an imaging range, display controller 14 that causes a display to display an instruction for a user to position camera indexes within the imaging range, the camera indexes indicating positions relative to the projection indexes in a camera coordinate system obtained by capturing the projection image, camera coordinate detector 15 that detects camera coordinates which are the coordinates of the camera indexes positioned, and controller 16 that determines, according to relative positional relations between the projection indexes and the camera indexes, correspondence relations between the camera coordinates within the imaging range of camera 40 and projection coordinates within the projection range of projector 20.

Thus, by using the projection control device according to the embodiment of the present disclosure, it is possible to obtain effects similar to those obtained by performing the projection control method.

Other Details

In the embodiments, among the structural elements, first projection controller 11, second projection controller 12, detection controller 13, display controller 14, camera coordinate detector 15, and controller 16, in particular, may be caused to function by executing a software program suitable for each structural element. Each structural element may be caused to function by a program executor, such as a CPU or a processor, reading and executing the software program stored in a recording medium, such as a hard disk or semiconductor memory, on a PC or a smartphone.

Each structural element may be hardware. The structural elements may be circuits (or an integrated circuit). These circuits may be incorporated into one circuit or be separate circuits. These circuits may be general-purpose or dedicated circuits.

General or specific aspects of the present disclosure may be embodied as a system, a device, a method, an integrated circuit, a computer program, or a recording medium such as a computer-readable CD-ROM. The general or specific aspects of the present disclosure may be embodied as any combination of the system, device, method, integrated circuit, computer program, and recording medium.

For instance, the present disclosure may be embodied as a terminal according to one of the embodiments or a system equivalent to the terminal. The present disclosure may be embodied as the projection control method, a program for causing a computer to perform the projection control method, or a non-transitory computer-readable recording medium storing such a program. It should be noted that the program includes an application program for causing a general-purpose portable terminal to operate as the portable terminal according to one of the embodiments.

In addition, in the embodiments, projection control device 10 is described as a single device. However, projection control device 10 may be embodied as more than one device. When projection control device 10 is embodied as devices, it does not matter how the structural elements of projection control device 10 described in each embodiment are distributed among the devices.

In the embodiments, projector 20 and camera 40 are separate devices. However, camera 40 may be an internal device of projector 20.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure. The present disclosure may include one or more embodiments obtained by making various changes envisioned by those skilled in the art to each embodiment or one or more embodiments obtained by combining the structural elements and the functions described in the embodiments within the spirit of the present disclosure.

INDUSTRIAL APPLICABILITY

The present disclosure may be used in commercial use performance involving video projection.

The invention claimed is:
1. A projection control method performed by a processor to control projection of an image by a projector, the projection control method comprising:
   causing the projector to project a projection image including a plurality of projection indexes positioned within a projection range of the projector;
   causing a camera to capture the projection image within an imaging range;
   causing a display to display an instruction for a user to position a plurality of camera indexes within the imaging range, the plurality of camera indexes indicating positions relative to the plurality of projection indexes in a camera coordinate system obtained by capturing the projection image;
   detecting camera coordinates which are coordinates of the plurality of camera indexes positioned; and
   determining, according to relative positional relations between the plurality of projection indexes and the plurality of camera indexes, correspondence relations between the camera coordinates within the imaging range of the camera and projection coordinates within the projection range of the projector.

2. The projection control method according to claim 1, further comprising:
causing the projector to project the image, by using the projection coordinates based on the correspondence relations determined.

3. The projection control method according to claim 1, wherein in the detecting, an operation to move, on the display, one of a group of the plurality of projection indexes or a group of the plurality of camera indexes is received, the operation being performed by the user to adjust positional relations between the plurality of projection indexes and the plurality of camera indexes, the plurality of projection indexes and the plurality of camera indexes being included in a camera image displayed on the display.

4. The projection control method according to claim 3, wherein the operation is a user operation to move, on the display, the plurality of projection indexes included in the camera image, to adjust the positional relations between the plurality of projection indexes and the plurality of camera indexes which are included in the camera image displayed on the display.

5. The projection control method according to claim 3, wherein the operation is a user operation to move the plurality of camera indexes on the display, to adjust the positional relations between the plurality of projection indexes and the plurality of camera indexes which are included in the camera image displayed on the display.

6. The projection control method according to claim 3, wherein adjustment, by the user, of the positional relations between the plurality of projection indexes and the plurality of camera indexes which are included in the camera image displayed on the display is superimposition, by the user, of the plurality of projection indexes and the plurality of camera indexes which are included in the camera image displayed on the display.

7. The projection control method according to claim 1, wherein the plurality of projection indexes are four projection indexes, and the plurality of camera indexes are four camera indexes.

8. The projection control method according to claim 7, wherein the determining includes determining, by using the four projection indexes and the four camera indexes, the correspondence relations between the camera coordinates within the imaging range of the camera and the projection coordinates within the projection range of the projector.

9. The projection control method according to claim 1, wherein the plurality of projection indexes are six projection indexes, and the plurality of camera indexes are six camera indexes.

10. The projection control method according to claim 9, wherein the determining includes determining, by using the six projection indexes and the six camera indexes, the correspondence relations between the camera coordinates within the imaging range of the camera and the projection coordinates within the projection range of the projector.

11. The projection control method according to claim 1, further comprising:
causing the camera to capture an image of a marker present in the projection range;
obtaining camera coordinates of the marker in the camera coordinate system in the image of the marker captured by the camera;
converting the camera coordinates of the marker into projection coordinates by using the correspondence relations determined; and
causing the projector to project the projection image at a position of the marker, by using the projection coordinates of the marker obtained through conversion, the position being a position of the marker when the image of the marker is captured by the camera.

12. The projection control method according to claim 11, causing the display to display a captured projection image captured by the camera,
wherein an image generated by capturing the projection image by the camera is a visible light image, and the image of the marker is an infrared image.

13. The projection control method according to claim 11, wherein the marker includes an infrared reflective material.

14. The projection control method according to claim 11, wherein the marker includes a light emitting diode (LED) and emits light.

15. The projection control method according to claim 1, further comprising:
moving the plurality of camera indexes after changing positions of the plurality of projection indexes positioned within the projection range.

16. A projection control device that controls projection of an image by a projector, the projection control device comprising:
a first projection controller that causes the projector to project a projection image including a plurality of projection indexes positioned within a projection range of the projector;
a detection controller that causes a camera to capture the projection image within an imaging range;
a display controller that causes a display to display an instruction for a user to position a plurality of camera indexes within the imaging range, the plurality of camera indexes indicating positions relative to the plurality of projection indexes in a camera coordinate system obtained by capturing the projection image;
a camera coordinate detector that detects camera coordinates which are coordinates of the plurality of camera indexes positioned; and
a controller that determines, according to relative positional relations between the plurality of projection indexes and the plurality of camera indexes, correspondence relations between the camera coordinates within the imaging range of the camera and projection coordinates within the projection range of the projector.

17. A projection control method performed by a processor to control projection of an image by a projector, the projection control method comprising:
causing the projector to project a projection image;
causing a camera to capture the projection image within an imaging range;
determining a plurality of projection index points within an image generated by capturing the projection image by the camera;
causing a display to display an instruction for a user to position a plurality of camera index points within the imaging range, the plurality of camera index points indicating positions relative to the plurality of projection index points in a camera coordinate system obtained by capturing the projection image;
detecting camera coordinates which are coordinates of the plurality of camera index points positioned; and determining, according to relative positional relations between the plurality of projection index points and the plurality of camera index points, correspondence relations between the camera coordinates within the imaging range of the camera and projection coordinates within the projection range of the projector.

* * * * *